United States Patent [19]
Becker

[11] 3,976,805
[45] Aug. 24, 1976

[54] PREPARATION OF HIGH-CONSISTENCY TOMATO PRODUCTS

[75] Inventor: Robert Becker, Richmond, Calif.

[73] Assignee: The United States of America as represented by the Secretary of Agriculture, Washington, D.C.

[22] Filed: Nov. 26, 1974

[21] Appl. No.: 527,323

Related U.S. Application Data

[63] Continuation of Ser. No. 142,951, May 13, 1971, abandoned.

[52] U.S. Cl. .............................. 426/599; 426/489; 426/519
[51] Int. Cl.² .......................................... A23L 1/28
[58] Field of Search ........... 426/599, 655, 489, 519, 426/520, 330.5

[56] References Cited
UNITED STATES PATENTS
3,366,490  1/1968  Wagner et al. .................... 426/599

OTHER PUBLICATIONS
*Food Technology*, vol. XI, No. 1, Whittenberger, Nutting, pp. 19–22, 1957.

*Primary Examiner*—Norman Yudkoff
*Assistant Examiner*—Martin G. Mullen
*Attorney, Agent, or Firm*—M. Howard Silverstein; William Takacs; David G. McConnell

[57] ABSTRACT

Tomato products of increased consistency are prepared by sequentially applying acidification and homogenization to juices or concentrates prepared by standard production techniques.

4 Claims, 1 Drawing Figure

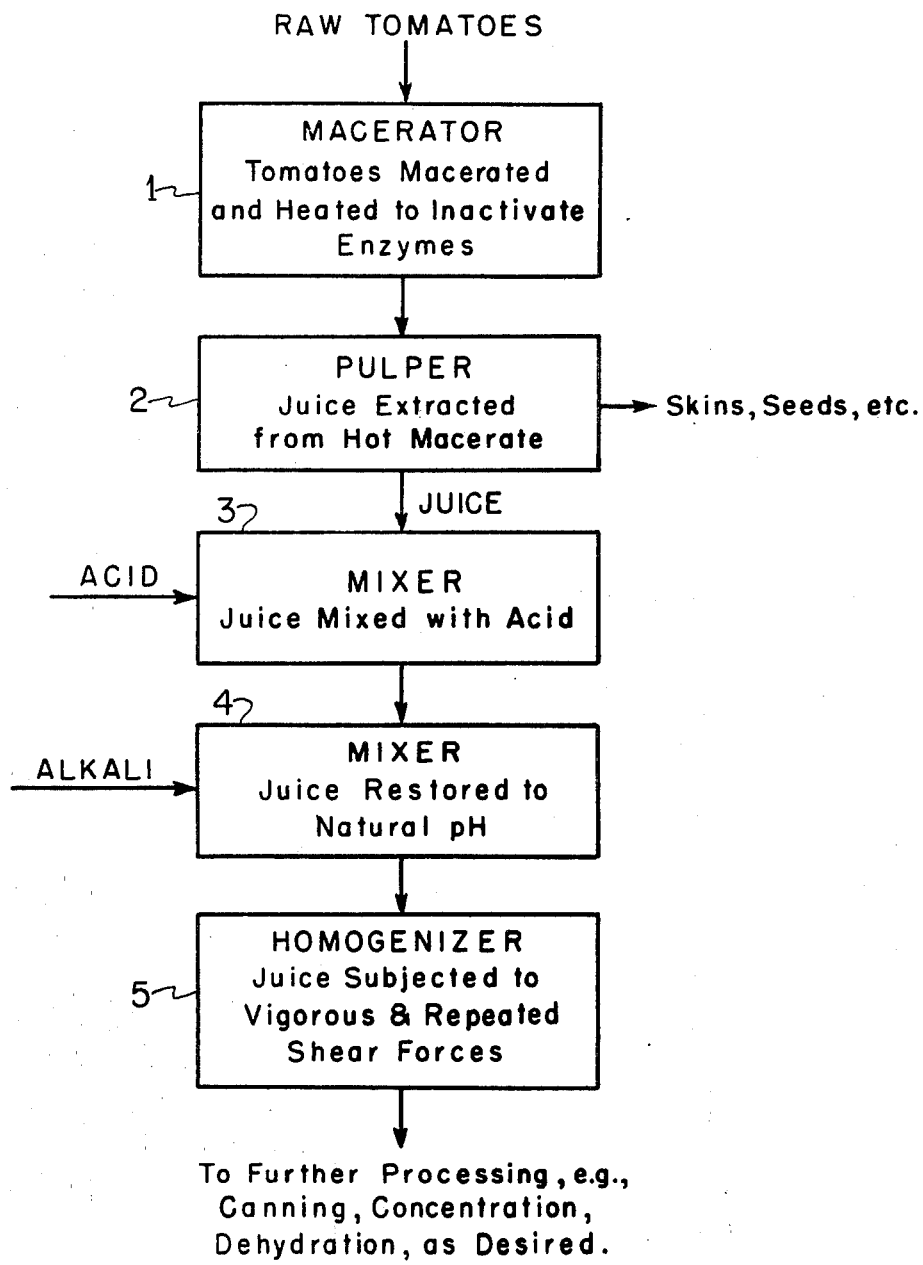

PREPARATION OF HIGH-CONSISTENCY TOMATO PRODUCTS

A non-exclusive, irrevocable, royalty-free license in the invention herein described, throughout the world for all purposes of the United States Goverment, with the power to grant sublicenses for such purposes, is hereby granted to the Government of the United States of America.

This is a continuation of my copending application Ser. No. 142,951, filed May 13, 1971, and now abandoned.

DESCRIPTION OF THE INVENTION

The invention relates to and has among its objects the provision of novel processes for preparing tomato products, such as juices and concentrates, of increased consistency. Further objects of the invention will be evident from the following description wherein parts and percentages are by weight unless otherwise specified. The verb "macerate" is employed herein—in common with its usage in the art—to denote application of mechanical action as in breaking up and subdividing tomatoes into a pulpy mass.

The annexed drawing is a flow sheet illustrating application of the process of the invention.

It is recognized in the industry that consistency is an important attribute of tomato juice. In particular, higher consistency represents better quality. It is to be especially noted that consistency has no fixed relationship with solids contents so that whereas two lots of tomato juice prepared by different procedures and/or different raw materials may have identical solids contents, their consistencies may be radically different. The matter of consistency is not only important with regard to tomato juice per se but also with regard to products prepared therefrom such as concentrated juice, pastes, sauces, ketchups, etc. In all these products a higher consistency signifies better quality and to attain such quality it is necessary that the juice employed as the starting material be of high consistency.

In the patents of J. R. Wagner et al U.S. Pat. Nos. 3,366,488, 3,366,489, and 3,366,490 there are disclosed procedures for preparing high-consistency tomato juices. These procedures have the common denominator of applying an acid to a tomato macerate, that is, the pulpy mass of juice, skins, seeds, etc. formed when tomatoes are subjected to maceration. For instance, as described in '488, raw tomatoes are subjected to maceration and heating. Hydrochloric acid is added to the hot macerate to reduce the pH to less than 3.5. The acidified macerate is then treated to separate the juice from the skins and seeds, and the juice is cooled and restored to its original pH by addition of sodium hydroxide, yielding a product of higher consistency than would be attained in the absence of the acid treatment. In the processes of '489 and '490 the acid treatment is applied as the raw tomatoes are being macerated and heated.

I have now found that a comparable result—namely, production of juice of increased consistency—is achieved by a procedure wherein (1) the acid is applied not to the tomato macerate nor to the raw tomatoes, but to the juice extracted therefrom, and (2) the treated juice is homogenized. The juice may be restored to its natural pH before or after homogenation, the former being generally preferred.

A primary advantage of the invention is that it can be employed for improving the consistency of juices which have been prepared by conventional procedures. Thus, if raw tomatoes are not available to the person intending to practice the invention, he may employ ordinary commercial tomato juice as his starting material. This approach is not feasible with the procedures of the Wagner et al patents, since they are keyed to starting with raw tomatoes.

Moreover, even if raw tomatoes are used as the starting material for the process of the invention, certain advantages are gained over the procedures of the Wagner et al patents. One advantage is that corrosion of the juice-preparation equipment is eliminated. This follows because juice preparation is performed at the natural pH of the tomatoes, rather than at the low pH used in the Wagner et al technique. In applying the process of the invention, the equipment for heating and macerating the tomatoes and for pulping the macerate (extracting the juice therefrom) may be of standard construction, rather than of special acid-resistant material. Another advantage of the invention lies in decreased power consumption. Increased consistency gives rise to increased resistance to performing operations such as mixing, pulping, etc. In the present process the increase in consistency is delayed until application of the homogenizing step whereby the power required for macerating, pulping, mixing, etc. is less than in the known procedures wherein consistency is developed early in the sequence of operations.

In a typical practice of the invention, one proceeds as follows:

1. In starting from raw tomatoes, these are converted into a juice by application of conventional techniques such as macerating, heating, and pulping. Alternatively, commercial tomato juice is used as the starting material. In either case, the juice will be one having the natural pH of tomatoes.

2. The juice is mixed with an amount of acid sufficient to provide a pH below 3. Usually, it is preferred to employ enough acid to provide a pH of about 1 to 2. pH's below 1 can be used but do not provide any practical advantage over the preferred pH range.

Hydrochloric acid is preferred because it is effective, inexpensive, and particularly because eventual neutralization of the product (with sodium hydroxide) yields sodium chloride — a common additive in tomato products. The hydrochloric acid may be added as such or in the form of a gas. Moreover, acids other than hydrochloric can be employed as the primary consideration is the establishment of a low pH. Thus, for example, one may employ such strongly ionized acids as sulfuric, ortho-, meta-, and pyrophosphoric. Acids such as tartaric, citric, and acetic are too weakly ionized to be of any practical usefulness. In view of the above considerations, generally, one may employ any acid which has an ionization constant greater than $1 \times 10^{-3}$ and which is non-toxic. It is, of course, within the scope of the invention to use mixtures of two or more acids, for example, a mixture of hydrochloric and any of the phosphoric acids.

It is preferred that the juice be hot (for example, at about 150°–212°F.) when it is acidified as under such conditions the desired effect takes place rapidly, i.e., as soon as the juice and acid are intimately mixed, or at most after a holding time of about 1 to 15 minutes. The effect desired is initiation of break-down of the cellular walls (of the fruit cells suspended in the juice) by release of pectinous material therefrom. It may be noted that the acid treatment per se does not cause any substantial increase in consistency; in fact, it often results in a thinning of the juice. Both acid treatment plus homogenization are required to provide the desired increase in consistency.

Since the acid treatment is preferably conducted under hot conditions, where a juice is first prepared from raw tomatoes, it is preferred that the juice from the pulper be acidified while it is still hot. In the event that one starts with a commercial juice, it is heated prior to acidification.

Although the acidification is preferred carried out in a hot state, it can be carried out at lower temperatures, e.g., at room temperature. However, in such case the desired chemical changes occur more slowly and the acidified material should be held for a period of about 30 to 180 minutes.

3. Following the acid treatment the juice is cooled, where necessary, to about room temperature and is neutralized to its normal pH (usually in the range 3.8 to 4.5) by incorporation of sodium hydroxide. Other alkaline materials such as sodium carbonate or bicarbonate may be used but are not preferred because of their foaming effect (caused by release of $CO_2$).

In an alternative, but not preferred, embodiment of the invention, the neutralization is postponed until after the homogenizing step described below.

4. Following the restoration of pH, the juice is subjected to homogenizing by applying vigorous and repeated shearing action. By such treatment the fruit cells suspended in the juice are deliberately damaged—ruptured, shredded, sheared, or otherwise mechanically injured—with the end result that the juice is increased in consistency. For carrying out the homogenization one can use various types of equipment. Among these are "Waring Blenders," "Osterizers," or the like—devices which provide a vessel with a rotating blade assembly in the base of the vessel. By rotating this blade at high speed the desired vigorous and repeated shearing action is attained. Another suitable type of equipment is a homogenizer (commonly used in creameries) which operates by forcing the juice under high pressure through a small orifice. Also useful are colloid mills which operate by subjecting the juice in a closely confined area to the action of the rapidly rotating multi-bladed rotor. Another type of equipment which may be used is a sonifier—a device which promotes cell disintegration by application of high-frequency sound waves. Other methods for accomplishing the homogenization operation will be evident to those skilled in the art from the foregoing examples. It is further obvious that the time and intensity of the homogenization will depend on such factors as the type of equipment selected, and the degree of consistency increase desired. In any particular case, trials may be run on pilot samples of juice, followed by measurements of the consistency of the products to select the conditions to be applied to the main batch.

Following the homogenization step (or, following the pH restoration if such is applied after homogenizing), the juice may be further processed in conventional manner. For example, it may be canned as a single-strength juice or it may be first concentrated to a paste or puree and canned in such state. It may be used, in single strength or concentrated form, in the preparation of soups, sauces, ketchups, preserves, aspic products, etc. Also, it may be converted into solid dehydrated products by such known techniques as concentration followed by foam-mat or vacuum dehydration or by spray drying. It is an important feature of the invention that the color, flavor, and nutrient value of the juice are not impaired so that it is suitable for all the uses for which conventional tomato juice is adapted.

Since the process of the invention produces a high-consistency juice, this product can be blended with conventional juices (ones of lower consistency) to provide a composite juice of intermediate consistency as may be required for a particular application. As an example of such procedure, a juice processing line may be operated for a first period of time in conventional manner and operated for a second period of time with application of the process of the invention, the two juices being then combined to yield the final product. By varying the relative duration of the first and second periods, products of a wide range of consistency can be produced.

Hereinabove, the invention has been explained in connection with its use to increase the consistency of tomato juice. In its broad aspect the invention can also be utilized for increasing the consistency of concentrated juice products such as ketchups, pastes, purees, etc., such products being generically referred to herein as concentrates. In a practice of this phase of the invention the concentrate is prepared by conventional procedures and is then subjected to the steps described in sections 2, 3, and 4 above. As an example, a typical practice of the invention would involve the following steps: Raw tomatoes are converted to a juice by application of the usual steps of maceration, heating, and pulping. The juice is then subjected to evaporation, preferably under vacuum, to the solids content desired. The resulting concentrate is treated with acid, its pH restored by addition of alkali, and is finally homogenized, thus yielding a concentrate having a consistency higher than that possessed by the original concentrate.

It is recognized that it is generally known in the art that homogenization of liquid foods often yields an increase in consistency. However, the increase in consistency attained by homogenization alone is not comparable to that obtained in the process of the invention wherein acidification precedes homogenization. For example, the process of the invention readily yields increases in consistency of from 300 to 1000% or more, whereas I have observed that homogenization alone applied to tomato juice or concentrates usually results in a thinning of the product or in rare cases the consistency is increased by a small degree, e.g., about 50–75%.

An illustrative embodiment of the invention is next described in detail, having reference to the annexed drawing which is a flow sheet depicting conversion of raw tomatoes into high-consistency juice.

Block 1 represents the step in the process wherein raw tomatoes, at their natural pH, are macerated and heated to inactivate the enzymes. The heating can be accomplished in various ways, as well known in the art. One technique involves exposing whole tomatoes or pieces of tomato to steam or a source of radiant energy such as infrared lamps or a microwave-irradiation device.

Preferably, the tomatoes are heated while concomitantly subjected to maceration. To achieve such an end, one may utilize the usual heating and macerating procedure as conventional in producing tomato juice by the hot-break system. Thus, raw tomatoes are fed into a vessel provided with steam coils or jackets, and a rotating blade assembly for comminuting the tomatoes and agitating the material in the vessel so that good heat transfer will be obtained. By use of such equipment the raw tomatoes can be efficiently formed into a hot macerate which is ready for the next step.

In cases where it is desired to achieve an especially rapid heating, one may employ a "drop-in" technique. This involves establishing a pool of tomato juice or tomato macerate (from a previous batch) in a vessel provided with heating means and a rotor for comminuting and mixing the contents of the vessel. The pool is maintained at about 200°F. and the tomatoes are fed into it at a predetermined rate. Because of the intimate contact with the hot liquid, the entering tomato material is very rapidly brought up to an enzyme-inactivating temperature. The hot macerate produced in the vessel is withdrawn at a rate commensurate with the feed rate, and this hot material is forwarded to the next step in the process.

Various other examples of systems for effecting the heating and macerating will be suggested to those skilled in the art from the above description. It is further obvious that regardless of the particular system used, the temperature and time of heating applied to the tomatoes should be sufficient to inactivate the enzymes. It is equally obvious that the program of heating should not be so drastic as to damage the tomato material.

The hot macerate produced in block 1 is then directed to block 2 which may take the form of a conventional pulper equipped with rotating cylinders of woven wire or perforated metal construction, wherein the juice is separated from the skins, seeds, cores, etc. The desired product from this operation is the juice which, of course, has its natural pH. It may also be noted that the operations to this point are purely conventional and widely used in commercial production of tomato juice.

The hot juice from pulper 2 is directed to mixer 3 where it is mixed with sufficient acid to provide a pH less than 3. After the mixing has been completed—or after holding for a period of about 1 to 15 minutes—the hot acidified juice is conveyed to mixer 4.

Mixer 4 is provided with cooling coils or the like, and the juice is cooled to about room temperature. Then it is mixed with sodium hydroxide solution in an amount to restore its natural pH.

The juice is then directed to homogenizer 5 where it is subjected to vigorous and repeated shear forces, these being applied until a product of desired consistency increase is attained.

The product issuing from homogenizer 5 may then be processed in known manner to produce canned juice, concentrated or dehydrated products, etc.

EXAMPLES

The invention is further demonstrated by the following illustrative examples.

Some of the experiments described in the examples are not representative of the invention; they are included for purpose of comparison.

The measurements of consistency referred to in Examples 1, 2, and 3 were carried out as follows: The sample of liquid is deaerated by subjecting it to a vacuum. Then, using an efflux tube consistometer, a measurement is made of the time required for 100 ml. of the liquid (at 25°C., 77°F.) to flow through the 3.3 mm. (I.D.) aperture of the instrument. With this test, a longer flow time reflects a higher consistency.

In the experiments reported in the examples (unless otherwise indicated), the maceration of the tomatoes and the homogenization of the juices were both carried out in a conventional blender—a device which includes a bowl and a rotating blade assembly in the base of the bowl for cutting and blending the material contained therein. For maceration purposes, the blade was operated at reduced speed to simply attain a comminution of the fruit to form a pulpy mass, usually referred to as a macerate. When the blender was used for homogenization, the blade was operated at high speed to attain vigorous and repeated shearing action, thus to cause cell disruption in addition to intimate mixing.

EXAMPLE 1

Type VF-145 tomatoes were quartered and divided into two comparable lots. Each lot was treated as follows:

Lot 1 (In accordance with the invention):
A. The tomatoes were cooked 1 minute in a microwave tunnel to 95°C. (203°F.), macerated for 5 seconds, and the hot macerate put through a pulper to separate the juice from the seeds and skins.
B. The hot juice from the pulper was acidified with concentrated hydrochloric acid to a pH of 1.5 and held at 150°F. for 5 minutes. The acidified juice was then cooled to room temperature, and the natural pH (4.4) was restored by addition of sodium hydroxide.
C. The juice was then homogenized in a blender at high speed for 2 minutes.

Lot 2 (Control):
A juice was prepared as described above in Part A and this juice, after cooling to room temperature, was directly homogenized as described in Part C.

Consistency measurements were made of the juices before and after homogenization. The results are tabulated below.

TABLE I

| | Hot Acid Treatment of Juice | | | | | |
|---|---|---|---|---|---|---|
| | Treatment of juice | | | | Consistency, sec. | |
| Lot | Acid | pH | Time min. | Temp., °F. | Before homogenizing | After homogenizing |
| 1 | HCl | 1.5 | 5 | 150 | 24 | 167 |
| 2 (Control) | None | — | — | — | 59 | 30 |

EXAMPLE 2

A. Tomatoes were macerated and heated quickly (to about 205°F.) by steam injection. The hot macerate was passed through a pulper to separate the juice from the skins and seeds. The juice so prepared was cooled to room temperature, and divided into portions.

Several portions of the juice were acidified with hydrochloric acid to pH levels designated below, held at room temperature for various times as indicated below, and finally homogenized in a blender at high speed for 1 minute.

As a control, 1 portion of the juice (from Part A) was directly homogenized in the same way as the other samples.

Consistency measurements were made of the juices before and after homogenizing. The conditions used and the results obtained are tabulated below.

Another portion of the concentrate was directly homogenized in a blender at high speed for 2 minutes.

Consistency measurements were made before and after homogenizing. Because of the thick nature of the materials, the method previously described could not be used. Instead, consistency was determined with a Bostwick consistometer, wherein one measures the length of the path that the liquid travels over a level

TABLE II

Cold (r.t.) Treatment of Juice

| | Treatment of juice | | | | Consistency, sec. | |
|---|---|---|---|---|---|---|
| Lot | Acid | pH | Time, min. | Temp. | Before homogenizing | After homogenizing |
| 1 | HCl | 1.3 | 180 | r.t. | 83 | 411 |
| 2 | HCl | 1.05 | 65 | r.t. | 113 | 414 |
| 3 | HCl | 1.05 | 135 | r.t. | 114 | 438 |
| 4 (Control) | None | — | — | — | 100 | 69 |

EXAMPLE 3

Tomatoes were macerated and heated (to about 205°F.) by steam injection. The hot macerate was passed through a pulper to separate the juice from the skins and seeds.

The hot juice was acidified to pH 2.75 by addition of hydrochloric acid, allowed to stand 5 minutes, cooled to room temperature, and the natural pH (about 4.4) restored by addition of sodium hydroxide.

The juice was divided into two portions, which were homogenized at different pressures in a creamery homogenizer.

Consistency measurements were made before and after homogenizing.

The results are tabulated below.

surface during a certain length of time, in this case 30 seconds. In this determination, the thicker the concentrate the slower its movement, hence the shorter its path length. Thus, unlike the previous data, in this instance smaller numbers reflect a higher consistency, and vice versa. The results obtained are summarized below.

TABLE IV

Effect of Acidification and Homogenization on Consistency of Tomato Juice Concentrate

| | | | | | Consistency*, cm. | |
|---|---|---|---|---|---|---|
| Lot | Acid | pH | Time, min. | Temp., °F. | Before homogenizing | After homogenizing |
| 1 | HCl | 1.6 | 5 | 165–175 | — | 4.4 |
| 2 (Control) | None | — | — | — | 13 | 7.3 |

*Bostwick consistometer, flow time 30 sec.

TABLE III

| | | Consistency, sec. | |
|---|---|---|---|
| Lot | Homogenizing pressure, psi. | Before homogenizing | After homogenizing |
| 1 | 500 | 102 | 482 |
| 2 | 2500 | 102 | 1100 |

EXAMPLE 4

A quantity of commercial tomato juice concentrate was divided into several portions.

One portion of the concentrate was acidified to pH 1.6 with hydrochloric acid, heated to 175°F., and held at 165°–175°F. for 5 minutes. The concentrate was then cooled to room temperature, neutralized to its original pH (4.42) with sodium hydroxide, and homogenized in a blender at high speed for 2 minutes.

Having thus described my invention, I claim:

1. A process for preparing tomato juice of increased consistency, which consists of
   a. heating raw tomatoes, at their natural pH, at a temperature and for a time sufficient to inactivate the enzymes, but insufficient to damage the tomatoes, said heating being carried out concomitantly with maceration of the raw tomatoes,
   b. extracting the juice from the tomato material,
   c. mixing said juice, which is essentially free from gross solids components, with an amount of non-toxic acid sufficient to provide a pH less than 3.0, said mixing being carried out at a temperature of about from 150 to 212° F.,
   d. cooling the so-treated juice,
   e. mixing said juice with an amount of non-toxic alkaline material to restore the juice to its natural pH, and
   f. homogenizing said juice by applying vigorous and repeated shearing forces to the juice, whereby to cause extensive physical damage to the fruit cells in the juice, for a time sufficient to cause a substantial increase in the consistency of the juice.

2. The process of claim 1 wherein the acid of Step *d* is hydrochloric in an amount to provide a pH about from 1 to 2.

3. A process for preparing tomato concentrate of increased consistency, which consists of a. heating raw tomatoes, at their natural pH, at a temperature and for a time sufficient to inactivate the enzymes, but insufficient to damage the tomatoes, said heating being carried out concomitantly with maceration of the raw tomatoes,
b. extracting the hot juice from the tomato material,
c. concentrating the tomato juice,
d. mixing said resulting concentrate, which is essentially free from gross solid components, with an amount of non-toxic acid sufficient to provide a pH less than 3.0, said mixing being carried out at a temperature of about from 150° to 212° F.,
e. cooling the so-treated concentrate,
f. mixing said concentrate with an amount of non-toxic alkaline material sufficient to restore the concentrate to its natural pH, and
g. homogenizing said concentrate by applying vigorous and repeated shearing forces to the concentrate, whereby to cause extensive physical damage to the fruit cells in the concentrate, for a time sufficient to cause a substantial increase in the consistency of the concentrate.

4. The process of claim 3 wherein the acid of Step *d* is hydrochloric in an amount to provide a pH about from 1 to 2.

* * * * *